UNITED STATES PATENT OFFICE.

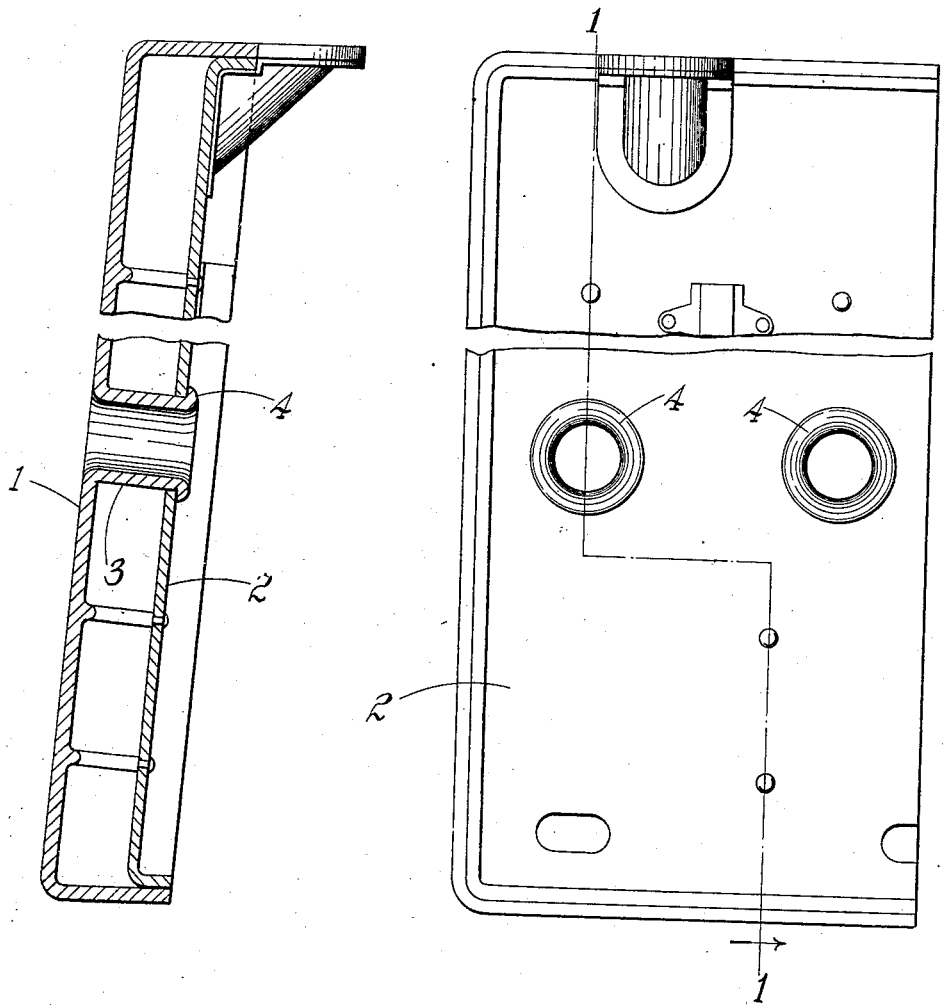

CHARLES WILLIAMS HAWKES, OF ALLENTOWN, PENNSYLVANIA.

WATER-JACKET.

No. 918,047.  Specification of Letters Patent.  Patented April 13, 1909.

Application filed January 18, 1909. Serial No. 472,894.

*To all whom it may concern:*

Be it known that I, CHARLES WILLIAMS HAWKES, citizen of the United States, residing at Allentown, in the county of Lehigh and State of Pennsylvania, have invented certain new and useful Improvements in Water-Jackets, of which the following is a full, clear, and exact description, reference being had to the accompanying drawings, forming a part hereof.

My invention has relation to improvements in water-jackets for cupola, blast and similar furnaces; and it consists in the novel construction of jacket more fully set forth in the specification and pointed out in the claims.

In the drawings, Figure 1 is a longitudinal vertical section on the line 1—1 of Fig. 2; and Fig. 2 is an elevation of one-half of the jacket broken above the twyers.

The present is in the nature of a specific modification, of the generic subject-matter of my U. S. Patent Number 807,076 dated December 12, 1905, and like it the invention has for its object to construct a water-jacket in which the element of leakage at the twyers shall be eliminated, the nipple forming the twyer herein being welded to the inside sheet instead of being punched and flared from the sheet as in the patent aforesaid. While in both instances the nipple becomes an integral part of the sheet, the welding thereof to the sheet has the advantage in that a nipple (and hence a twyer) of any length may be employed, whereas a punched and flared nipple has its limitations in the matter of length. These limitations depend on the degree to which the metal can stand stretching and expansion, and since the employment of a welded nipple does not depend on these limitations, any distance between the sheets (the fire sheet and outer sheet) may be spanned by such a nipple.

In detail the invention may be described as follows:

Referring to the drawings, 1 represents the fire-sheet or inside sheet of the jacket and 2, the outside sheet thereof. At points where it is desirable to locate a twyer, an opening is formed in the inside sheet and around said opening is welded a hollow nipple 3 which thereby becomes an integral part of the sheet. Opposite the free end of the nipple there is formed an opening in the outside sheet through which the end of the nipple is passed, the nipple being subsequently expanded against the outer face of said outside sheet forming a ring or bead 4. This of course is only a preferred form of connection between the nipple and the outside sheet, and any other suitable method of connecting such nipple to the outside sheet may be resorted to, my present invention not being concerned with such details. Neither is the precise form of the nipple constituting the twyer of importance.

A cylindrical, conical or flaring form of nipple or in fact any suitable form would fall within my invention, the important feature of which is the welding of the nipple 3 to the inside sheet 1.

While the Patent 807,076 referred to contemplates broadly the integral union of the base of the nipple with the inside sheet, the present invention covers the specific method of securing such integrality by welding the nipple to such sheet.

Obviously, the invention is not to be limited to water-jackets, but may be applied to air-jackets, boiler constructions and the like. So too, the openings around which the nipple is disposed need not be "twyer openings" since the nipple may serve other purposes than a twyer. Neither need the axis of the nipple be at right angles to either of the sheets.

Such features of construction shown but not referred to, are well known and form no part of the present invention.

Having described my invention what I claim is:

1. A jacket comprising an inside and an outside sheet and having twyer-openings formed in the respective sheets, a nipple welded to the inside sheet around the opening in such sheet, and having its opposite end secured to the outside sheet.

2. A jacket comprising an inside and an outside sheet and having twyer openings formed in the respective sheets, a nipple welded to the inside sheet around the opening in such sheet, the outer end of the nipple being passed through the opening of the outside sheet and expanded against the outer face thereof.

3. A jacket comprising an inside and an outside sheet, and having openings formed therein, and a nipple welded at one end to the inside sheet around the opening formed therein and spanning the space between the sheets, the opposite end of the nipple being
5 secured to the outside sheet around the opening in said sheet.

4. In a jacket, an inside or fire sheet having an opening formed therein, and a hollow nipple welded to the sheet around the opening. 10

In testimony whereof I affix my signature, in presence of two witnesses.

CHARLES WILLIAMS HAWKES.

Witnesses:
 FRANK H. GUY,
 J. O. HAMILTON.